United States Patent
Li et al.

(10) Patent No.: US 9,940,207 B2
(45) Date of Patent: Apr. 10, 2018

(54) FAILING BACK BLOCK OBJECTS IN BATCH

(71) Applicant: EMC Corporation, Hopkinton, MA (US)

(72) Inventors: Jinwei Li, Shanghai (CN); Gang Cao, Shanghai (CN); Walter Lei Wang, Shanghai (CN); Matt Zhu Zhang, Shanghai (CN); Ren Ren, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 15/095,953

(22) Filed: Apr. 11, 2016

(65) Prior Publication Data

US 2016/0306717 A1 Oct. 20, 2016

(30) Foreign Application Priority Data

Apr. 15, 2015 (CN) .......................... 2015 1 01787362

(51) Int. Cl.
*G06F 9/46* (2006.01)
*G06F 11/14* (2006.01)
*G06F 17/30* (2006.01)

(52) U.S. Cl.
CPC .... *G06F 11/1471* (2013.01); *G06F 17/30082* (2013.01); *G06F 2201/805* (2013.01); *G06F 2201/85* (2013.01)

(58) Field of Classification Search
None
See application file for complete search history.

(56) References Cited

U.S. PATENT DOCUMENTS

| | | | | |
|---|---|---|---|---|
| 6,782,537 B1* | 8/2004 | Blackmore | ............. | G06F 9/524 718/106 |
| 7,231,403 B1* | 6/2007 | Howitt | .................... | H04L 41/00 |
| 7,496,726 B1* | 2/2009 | Nussbaum | .............. | G06F 9/466 711/119 |
| 7,912,965 B2* | 3/2011 | Wahl | ..................... | G06F 21/552 707/783 |
| 7,984,444 B1* | 7/2011 | Shavit | ..................... | G06F 9/526 707/999.01 |
| 8,176,491 B1* | 5/2012 | Plummer | ................ | G06F 9/526 717/136 |
| 8,719,225 B1* | 5/2014 | Rath | ................. | G06F 17/30575 707/634 |
| 2005/0131899 A1* | 6/2005 | Dvorkin | .................. | G06F 9/526 |
| 2005/0204183 A1* | 9/2005 | Saika | .................. | G06F 11/2025 714/4.11 |
| 2007/0157202 A1* | 7/2007 | Moir | ........................ | G06F 9/52 718/100 |
| 2008/0098180 A1* | 4/2008 | Larson | .................... | G06F 15/16 711/150 |

(Continued)

*Primary Examiner* — Adam Lee
(74) *Attorney, Agent, or Firm* — Krishnendu Gupta; Konrad R. Lee (57) ABSTRACT

Embodiments of the present disclosure disclose a method, an apparatus and a computer program product for failing back block objects in batch by performing failback operations in batch to part of block objects of one or more of existing file systems; determining a delay time required for performing failback operations in a next batch based on the recorded number of block objects that have been failed back in last batches; and performing the failback operations in the next batch to remaining block objects after the delay time.

18 Claims, 3 Drawing Sheets

(56) References Cited

U.S. PATENT DOCUMENTS

| | | | |
|---|---|---|---|
| 2009/0150618 A1* | 6/2009 | Allen, Jr. | G06F 12/0862 711/137 |
| 2009/0228511 A1* | 9/2009 | Atkin | G06F 17/30076 |
| 2011/0016470 A1* | 1/2011 | Cain, III | G06F 9/528 718/101 |
| 2011/0029711 A1* | 2/2011 | Dhuse | G06F 11/1076 711/4 |
| 2011/0055170 A1* | 3/2011 | Mark | G06F 17/30067 707/691 |
| 2011/0082831 A1* | 4/2011 | Gudlavenkatasiva | G06F 17/30578 707/610 |
| 2012/0066190 A1* | 3/2012 | Adkins | G06F 17/30088 707/703 |
| 2012/0072692 A1* | 3/2012 | Sudhakar | G06F 9/526 711/163 |
| 2012/0109912 A1* | 5/2012 | Donze | H04L 41/12 707/694 |
| 2012/0204060 A1* | 8/2012 | Swift | G06F 11/1435 714/15 |
| 2012/0216202 A1* | 8/2012 | Douros | G06F 9/542 718/102 |
| 2013/0055269 A1* | 2/2013 | Sukenari | G06F 9/467 |
| 2013/0290249 A1* | 10/2013 | Merriman | G06F 17/30578 707/610 |
| 2014/0358858 A1* | 12/2014 | Camble | G06F 11/0715 707/634 |
| 2015/0089505 A1* | 3/2015 | Malaiyandisamy | G06F 9/5072 718/101 |
| 2015/0234933 A1* | 8/2015 | Grover | G06F 17/30949 707/800 |
| 2015/0378761 A1* | 12/2015 | Sevigny | G06F 9/45558 718/1 |

* cited by examiner

FAILING BACK BLOCK OBJECTS IN BATCH

RELATED APPLICATION

This application claim priority from Chinese Patent Application Number CN2015101787362, filed on Apr. 15, 2015 at the state intellectual property office, China, titled "METHOD AND APPARATUS FOR FAILING BACK BLOCK OBJECTS IN BATCH," the contents of which is herein incorporated by reference in entirety.

FIELD

Example embodiments of the present disclosure generally relate to failback.

BACKGROUND

In recent time, with higher configurations of block objects, e.g., supporting automatic thin provisioning, advanced snaps, and deduplication, among other features, high-end storage products (e.g., VNX2® of EMC Corporation®) have become powerful in their functions so as to serve different kinds of business demands Typically, such advanced features share the same underlying technology to construct a considerable number of upper block objects, such as logical unit numbers (LUNs), snaps, and snap LUNs, etc., and at the same time provide cutting-edge capabilities. However, such advancements also result in burdening a storage processor (e.g., VNX2 storage processor) especially when the storage processor is booting up.

Generally, a storage product with traditional dual-controller architecture (e.g., VNX2 of EMC Corporation) may support a capability of responding to external production workloads from two storage processors. Typically, internally, under the control of load balance, block objects may be owned only on one of the storage processors, and due to this implementation, when a storage processor is booting from normal reboot or crash, some block objects like LUNs, snaps and snap LUNs may be immediately be failed back to an original storage processor booting up based on an overall load balancing mechanism, which may result in a relatively huge internal workload. Such transient internal workload may result two major issues for the booting up storage processor. Firstly, performance of a storage processor may be considerably degraded, and response to a workload serving an external host may be slowed down. Secondly, time out of failing back block objects may cause interruption of production.

Conventionally, a block object to be failed back may be randomly picked up without knowledge of an underlying shared file system. In general, when a system is configured with massive block objects and in some high I/O profiling environment, much time may be taken for all block objects to be failed back. In general, because it may be infeasible to make all block objects online and ready on time, a storage processor may finally crash; and graver still, other storage processors might also crash at the same time. In general, such a situation may be grave, because it may cause service interruption in a user's production environment, such that storage products (e.g., VNX2 of EMC Corporation) may not fit into some types of production environments, e.g., the popular Open Stack environment.

SUMMARY

Accordingly example embodiments of the present disclosure provide an apparatus, a computer program product and a method for failing back block objects in batch by performing failback operations in batch to part of block objects of one or more of existing file systems; determining a delay time required for performing failback operations in a next batch based on a recorded number of block objects that have been failed back in last batches; and performing a failback operations in the next batch to a remainder of block objects after the delay time.

BRIEF DESCRIPTION OF THE DRAWINGS

Further understanding of the present disclosure is provided using the accompanying drawings that constitute part of the present disclosure. The schematic embodiments of the present disclosure and their explanations are used for interpreting the present disclosure, not constituting improper limitation to the present disclosure. In the accompanying drawings.

DETAILED DESCRIPTION

Hereinafter, various exemplary embodiments of the present disclosure will be described in detail with reference to the accompanying drawings. It should be noted that these drawings and depictions only relate to exemplary embodiments. It should be pointed out that based on the descriptions infra, alternative embodiments of the structures and methods disclosed here would be easily contemplated, and such alternative embodiments may be used without departing from the principle as claimed in the present disclosure.

It should be understood that providing these exemplary embodiments is only for enabling those skilled in the art to better understand and then implement embodiments of the present disclosure, and not intended to limit the scope of the present disclosure in any manner.

Terms such as "comprise," "include" and their similarities used here should be understood as open terms, i.e., "comprising/including but not limited to." The term "based on" refers to "at least partially based on." The term "one embodiment" refers to "at least one embodiment"; the term "another embodiment" refers to "at least one another embodiment". Relevant definitions of other terms will be provided in the following description.

According to one embodiment of the present disclosure, there may be provided a method for failing back block objects in batch. One embodiment may include performing failback operations in batch to part of block objects of one or more of existing file systems. A further embodiment may include determining a delay time required for performing failback operations in a next batch based on a recorded number of block objects that may have failed back in previous batches. A further embodiment may include performing a failback operations in a subsequent batch to a remainder of (remaining) block objects after a delay time.

In one embodiment, when a storage processor is booting up, a list of existing file systems may be built such that failback operations in a batch may be performed on one or more of the existing file systems. In a further embodiment, performing failback operations in a batch to part of the block objects of one or more of existing file systems may include traversing a list to look up a current file system on which block objects need to be failed back. And, a further embodiment may include performing failback operations in a batch to part of block objects on a current file system. In various embodiments, a failback operation may include the process of restoring operations to a primary system and/or facility. In certain embodiments, a failback operation may occur after a failover operation from a primary system and/or facility to a secondary system and/or facility.

In a further embodiment, performing failback operations in a batch to part of block objects of one or more of existing file systems may include suspending failback operations in a batch based on an amount of file systems being found. In a still further embodiment, suspending failback operations in a batch based on an amount of file systems being found may include comparing an amount of file systems being found with a first threshold. And, still a further embodiment may include suspending failback operations in a batch when an amount of file systems being found is greater than a first threshold.

In yet a further embodiment, performing failback operations in a batch to part of block objects of one or more of existing file systems may include, in a same batch, performing failback operations to all block objects on a same file system. In a further embodiment, performing failback operations in a batch to part of block objects of one or more of existing file systems may include recording an amount of block objects that have already issued failback operations in a batch. And, yet a further embodiment may include suspending failback operations in a batch based on an amount of block objects.

In a further embodiment, suspending failback operations in a batch based on an amount of block objects may include comparing an amount of block objects with a second threshold. And, a further embodiment may include suspending failback operations in a batch when an amount of block objects is greater than a second threshold.

In a further embodiment, determining a delay time required for performing failback operations in a subsequent batch based on a recorded number of block objects that have been failed back in previous batches may include recording a first amount of block objects that have already issued failback operations in a latest batch. And, a further embodiment may include computing a second amount of block objects that have already issued failback operations in a latest batch (multiple batches.) In a further embodiment, determining a delay time required for performing failback operations in a subsequent batch based on a recorded number of block objects that have been failed back in previous batches may include computing a delay time required for performing failback operations in a subsequent batch based on a first and a second amount.

According to one embodiment of the present disclosure, there may be provided an apparatus for failing back block objects in batch. In one embodiment, the apparatus includes a processing module that may be configured to perform failback operations in a batch to part of block objects of one or more of existing file systems. A further embodiment may include a delay time determining module that may be configured to determine a delay time required for performing failback operations in a subsequent batch based on a recorded number of block objects that have been failed back in previous batches. A further embodiment may include a delay time processing module that may be configured to perform failback operations in a subsequent batch to a remainder of (remaining) block objects after a delay time.

In one embodiment, when a storage processor is booting up, a list of existing file systems may be built such that failback operations in a batch may be performed on one or more of the existing file systems. In another embodiment, a processing module may include a looking up unit configured to traverse a list to look up a current file system on which block objects need to be failed back. And in a further embodiment a processing unit may be configured to perform failback operations in a batch to part of block objects on a current file system.

In a further embodiment, a processing module may further include: a first suspending unit that may be configured to suspend failback operations in a batch based on an amount of file systems being found. In a still further embodiment, a first suspending unit may be configured to: compare an amount of file systems being found with a first threshold; and suspend failback operations in a batch when the amount of the file systems being found is greater than a first threshold.

In a yet further embodiment, a processing module may be further configured to: in a same batch, perform failback operations to all block objects on a same file system. In a further embodiment, a processing module may further include: a first recording unit that may be configured to record an amount of block objects which have already issued failback operations in a batch. Andin yet a further embodiment, a processing module may further include a second suspending unit configured to suspend failback operations in a batch based on an amount of block objects. In a further embodiment, a second suspending unit may be configured to: compare an amount of block objects with a second threshold. And in yet a further embodiment, a second suspending unit may be configured to suspend failback operations in a batch when an amount of block objects is greater than a second threshold.

In a further embodiment, a delay time determining module may include a second recording unit that may be configured to record a first amount of block objects which have already issued failback operations in a latest batch. And in a further embodiment, a delay time determining module may further include a first computing unit that may be configured to compute a second amount of block objects which have already issued failback operations in a latest multiple batch. In a further embodiment a delay time determining unit may further include: a second computing unit that may be configured to compute a delay time required for performing failback operations in a subsequent batch based on a first and second amount.

According to one embodiment, there may be provided a computer program product for failing back block objects in batch. In a further embodiment, a computer program product may be tangibly stored on a non-transient computer readable medium and containing computer executable instructions that, when being executed, enables the computer to perform any steps of the method disclosed above.

Many embodiments of the present disclosure may control an amount of block objects failed back in one batch, and may dynamically adjust a delay time between two batches, thereby avoiding pressure onto a booting up storage processor in a short term, and meanwhile failback of all block objects on a same file system may be completed in one batch, thereby ensuring substantial consistency. It may be foreseen that even if an amount of block blocks is further increased for a storage product in the future, embodiments of the present disclosure may still ensure that a system may be in a normal operating state.

Figure 1:
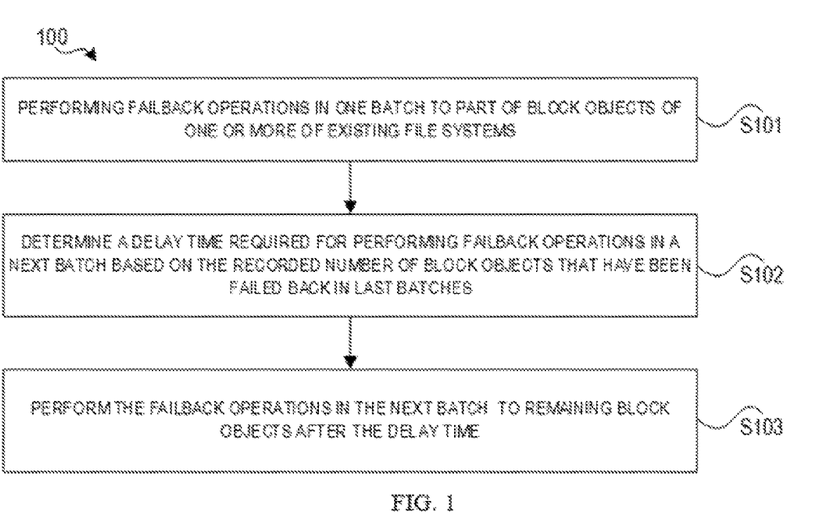
FIG. 1 shows an exemplary flow diagram of a method 100 for failing back block objects in batch according to embodiments of the present disclosure.

Now, refer to FIG. 1, in which a flow diagram of an exemplary method 100 for failing back block objects in batch according to the embodiments of the present disclosure is presented. The method 100 comprises steps S101-S103. In step S101, failback operations in batch are performed to part of block objects of one or more of existing file systems. And, step S101 further comprises recording an amount of block objects which have already issued failback operations in the batch; and suspending the failback operations in the batch based on the amount of the block objects. And step S101 further comprises suspending failback operations in the batch based on an amount of file systems being found. In step S102, a delay time required for performing failback operations in a next batch is determined based on the recorded number of block objects that have been failed back in last batches. Step S102 includes recording a first amount of block objects which have already issued failback operations in a latest one batch; computing a second amount of block objects which have already issued failback operations in the latest multiple batches; and computing the delay time required for performing the failback operations in the next batch based on the first and second amount. In step S103, after the delay time, the failback operations in the next batch are performed to remaining block objects.

According to one embodiment of the present disclosure, when a storage processor is booting up, a list of existing file systems may be built. In an example embodiment, suppose there are 5 file systems in total in a built list L of an existing file system, which are F1, F2 . . . F5 in succession. In a further embodiment, in one batch, a list of existing file systems may be first traversed so as to look up a current file system on which block objects need to be failed back. In a further embodiment, subsequently failback operations in batch may be performed to block objects on a current file system. In an example embodiment, in the above instance, a list L may be first traversed to look up file systems on which block objects need to be failed back. In a further exemplary embodiment, if file system F1 is first found; then failback operations in batch may be performed to the block objects on F1. In a further embodiment, subsequently list L may be traversed to look up a next file system on which block objects need to be failed back. In a further exemplary embodiment, if file system F2 if found; then failback operations in batch may be performed to block objects on F2.

In a further embodiment, as disclosed above, step S101 may further include suspending failback operations in a batch based on an amount of file systems being found. In a specific embodiment, an amount of file systems being found may be compared with a first threshold; and when the amount of file systems is greater than the first threshold, failback operations in the batch may be suspended. In an example embodiment, suppose it is determined based on experiment data or historical experience that an amount of file systems permitted for failback operations in one batch is 2 (i.e., the first threshold is 2), when the amount of file systems being found is more than 2, this failback operations may be suspended. In the example embodiment discussed above, after failback operations to block objects on file systems F1 and F2 are completed, a list L may be continuously traversed to find a next file system on which block objects that need to be failed back may be F4. In a further embodiment, however, amount of file systems being found is 3 in total, i.e., more than the first threshold 2, then this batch for failback operations may be suspended (i.e., not continuously failing back the block objects on F4).

According to one, step S101 may further include recording an amount of block objects which have already issued failback operations in a batch. And in a further embodiment may also include suspending the failback operations in a batch based on an amount of block objects. In a specific embodiment, an amount of block objects may be compared with a second threshold; and when the amount of block objects is greater than a second threshold, failback operations in a batch may be suspended. In an example embodiment, suppose it is determined based on experiment data or historical experience that an amount of block objects permitted for failback operations in one batch is 100 (i.e., the second threshold is 100), then when an amount of block objects which have already issued failback operations is more than 100, the failback operations in this batch may be suspended. In the above example embodiment, suppose an amount of block objects that need to be failed back on F1 is 60, the amount of block objects that need to be failed back on F2 is 41, and the amount of block objects that need to be failed back on F4 is 10, then first, failback operations in a batch may be performed to block objects on F1; when all of the block objects on F1 are failed back, a recorded amount of block objects which have already issued failback operations is 60. And, in a further embodiment because 60 is less than a second threshold 100, block objects on F2 may be failed back; and, when all block objects on F2 are already failed back, a current recorded amount of block objects which have already issued failback operations may be 101 (i.e., 60+41=101). And, in a further embodiment, since 101 is more than a second threshold 100, this batch may now be suspended (i.e., not continuing to perform failback operations in a batch to the block objects on F4).

According to one embodiment, failback operations of all block objects on a same file system may be performed in a same batch. In an example embodiment, as disclosed above, file system F1 has 60 block objects in total that need to be failed back, and then failback operations to the 60 block objects may have to be completed in one batch. In a further embodiment, such a situation should be avoided: and part of block objects (e.g., 20 block objects, among the 60 block objects of file system F1, which have issued failback operations) may be on one storage processor, while a remaining block objects (e.g., remaining 40 block objects, among the 60 block objects of file system F1, which have not issued failback operations yet) may be on another storage processor. In a further embodiment, such an inconsistent in ownership may result in causing serious issues such as degradation of system performance, etc.

In a further embodiment, the following condition likely exists: for example, suppose that an amount of block objects that need to be failed back on F1 is 60, the amount of block objects that need to be failed back on F2 is 41, and the amount of block objects that need to be failed back on F4 is 10, and it may be re-supposed that a second threshold is 70 (i.e., the amount of block objects that are permitted for failback operations in one batch is 70). In a further embodiment, when all of the block objects on F1 are already failed back, the recorded amount of block objects which have issued failback operations may be 60. In a further embodiment, because 60 is smaller than 70, failback operations in a batch may be performed to block objects on F2. In a further embodiment, after failback operation to a $11^{th}$ block object on F2 is performed, a recorded amount of block objects that have issued failback operations may reach 71, and this batch may be suspended. In a further embodiment, however, because an amount of block objects that need to be failed back on F2 is 41, it may result in that 11 block objects on the file system F2 may be on one storage processor, while the other 30 block objects may be on another storage processor. In a further embodiment, in order to shun from an issue of inconsistent ownership, no block object on F2 may be failed back in this batch, thereby ensuring that failback operations to all block objects on a same file system may be completed in one batch.

In a further embodiment, the method 100 proceeds to step S102, wherein as discussed previously, in step S102, a delay time required for performing failback operations in a next batch is determined based on the recorded number of block objects that have been failed back in last batches. According to on embodiment, step S102 may include recording a first amount of block objects which have already issued failback operations in a latest one batch. And a further embodiment may include computing a second amount of block objects which have already issued failback operations in the latest multiple batches. a further embodiment may include computing the delay time required for performing the failback operations in the next batch based on the first and second amount.

In an example embodiment, suppose an amount of block objects permitted for failback operations in one batch is M, the amount of block objects that have issued failback operations in the latest one batch is $N_1$ (i.e., the first amount is $N_1$), and the total amount of block objects that have issued failback operations in the latest K batch is $N_K$ (i.e., the second number is $N_K$), in such a case. more internal workload may be generated for active blocks being in failback operations compared with block objects that have already been failed back, a delay time required for a next batch may be calculated according to Equation (1) as below:

$$\text{Delay time} = (R \times (NK - N1) + N1)/M \times T \quad (1)$$

In Equation (1), T denotes a fixed delay time (unit: second), R denotes a weight, where T, R, and K are all determined based on experiment data or historical experience. In an example embodiment, suppose R=0.2, T=1s, K=10, M=100, $N_1$=50, $N_K$=200, then delay time calculated according to Equation (1) may be about (0.2×(200−50)+50)/100× 1s=0.8s.

In a further embodiment method 100 proceeds to step S103, wherein as disclosed previously, in step S103, after the delay time, failback operations in a subsequent batch may be performed to remaining block objects. According to one embodiment, step S103 is similar to step S101, except that in step S103, failback operations in a batch may be performed to a remained of (remaining) block objects after waiting for a delay time determined in step S102 (e.g., 0.8 second), but a process of failing back a remainder of block objects in a batch is identical to step S101, and step S103 will not be detailed here. By far, the method 100 ends.

In one embodiment, throughout the depiction of method 100, it may be understood that failback operations in one batch may be guided by two important factors: one factor may be the waiting time between two batches; the other factor may be processing limited amount of file systems or block objects in one batch. In a further embodiment, the waiting time may be dynamically adjusted based on a record of the latest historical failback operations so as to ensure that a storage processor can smoothly boot up to handle all block objects that need to be failed back, and at the same time serve other requests such as configuration modifications, production I/O, etc.

Figure 2:
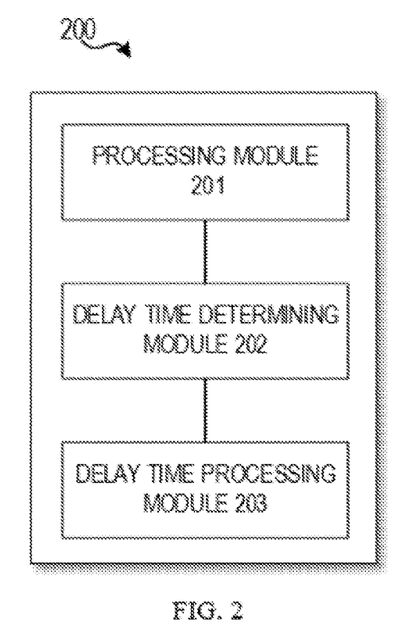
FIG. 2 shows an exemplary block diagram of an apparatus 200 for failing back block objects in batch according to embodiments of the present disclosure.

Now, refer to FIG. 2, in which a block diagram of an exemplary apparatus 200 for failing back block objects in batch according to the embodiments of the present disclosure is presented. Apparatus 200 includes processing module 201 configured to perform failback operations in batch to part of block objects of one or more of existing file systems; a delay time determining module 202 configured to determine a delay time required for performing failback operations in a subsequent batch based on the recorded number of block objects that have been failed back in previous batches; and delay time processing module 203 configured to perform the failback operations in the subsequent batch to remaining block objects after the delay time.

According to the embodiments of the present disclosure, when the storage processor is booting up, processing module 201 builds a list of existing file systems so as to perform failback operations in batch on one or more of the existing file systems.

According to the embodiments of the present disclosure, processing module 201 includes a looking up unit configured to traverse the list to look up a current file system on which block objects need to be failed back; and a processing unit configured to perform failback operations in batch to part of block objects on the current file system. According to the embodiments of the present disclosure, processing module 201 further includes a first suspending unit configured to suspend the failback operations in the batch based on an amount of file systems being found. According to the embodiments of the present disclosure, the first suspending unit is configured to: compare the amount of the file systems being found with a first threshold; and suspend the failback operations in the batch when the amount of the file systems being found is greater than the first threshold.

According to the embodiments of the present disclosure, processing module 201 is further configured to: in a same batch, perform failback operations to all block objects on a same file system. According to the embodiments of the present disclosure, processing module 201 further comprises: a first recording unit configured to record an amount of block objects which have already issued failback operations in the batch; and a second suspending unit configured to suspend the failback operations in the batch based on the amount of the block objects. In a further embodiment, the second suspending unit is configured to: compare the amount of the block objects with a second threshold; and suspend the failback operations in the batch when the amount of the block objects is greater than the second threshold.

According to the embodiments of the present disclosure, delay time determining module 202 comprises: a second recording unit configured to record a first amount of block objects which have already issued failback operations in the latest batch; and a first computing unit configured to compute a second amount of block objects which have already issued failback operations in the multiple latest batches.

According to the embodiments of the present disclosure, delay time determining unit 202 further comprises: a second computing unit configured to compute the delay time required for performing the failback operations in the subsequent batch based on a first and a second amount.

For sake of clarity, some optional modules of apparatus 200 are not shown in the figure. However, it should be understood that various features described with reference to the method of the present disclosure are also suitable for apparatus 200 and may be implemented on apparatus 200. Moreover respective modules in apparatus 200 may be hardware modules or software modules, for example in some embodiments, apparatus 200 may be implemented by software and/or firmware, partially or completely, e.g., implemented as a computer program product embodied on the computer readable medium. Alternatively or additionally, apparatus 200 may be implemented partially or completely based on hardware, e.g., an integrated circuit (IC) chip, an application-specific integrated circuit (ASIC), a system on chip (SOC), a field programmable gate array (FPGA), etc. The scope of the present intention is not limited to this aspect. Several modules of apparatus may be combined into a single module, wherein the single module may be configured to perform the task of each of the separate modules in an orderly manner.

Figure 3:
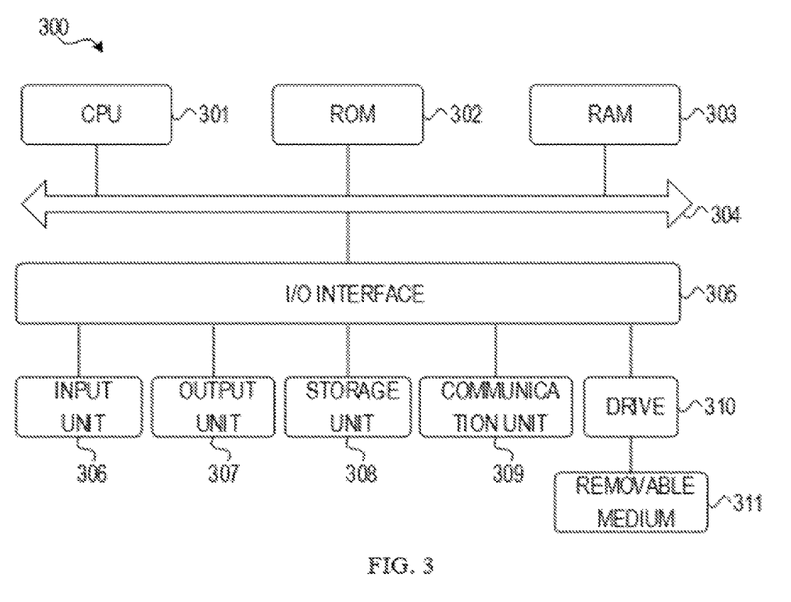
FIG. 3 shows a block diagram of a computer system 300 adapted to implement exemplary embodiments of the present disclosure.

Now, refer to FIG. 3, in which a block diagram of computer system 300 adapted to implement the exemplary embodiments of the present disclosure is shown. As shown in FIG. 3, computer system 300 comprises central processing unit (CPU) 301, which may perform any proper actions and processing based on a program stored in a read-only memory (ROM) 302 or a program loaded from memory section 308 to random access memory (ROM) 303. RAM 303, further stores various programs and data needed for operations of apparatus 200. CPU 301, ROM 302, and RAM 303 are connected to each other via bus 304. Input/output (I/O) interface 305 is also connected to bus 304.

The following components are connected to I/O interface 305: an input part including a keyboard, a mouse and the like; output part 307 including a cathode ray tube (CRT), a liquid crystal display (LCD) and a loudspeaker, etc.; memory part 308 including a hard disk, etc.; communication part 309 including a network interface card such as LAN card, model, etc. Communication part 309 performs communication processing via a network such as Internet. Drive 310 may also be connected to I/O interface 305 as required. Removable medium 311, such as a magnetic disk, an optic disk, a magneto-optical disk, a semiconductor memory, and the like, is mounted on drive 310 as required, such that a computer program read therefrom is mounted in storage 308 as required.

In particular, according to the embodiments of the present disclosure, method 100 described with reference to FIG. 1 may be implemented as computer software programs. For example, embodiments of the present disclosure include a computer program product that is tangibly stored on a non-transient computer-readable medium and comprises computer executable instructions that when being executed, causes the computer to perform any steps of method 100 disclosed above.

In view of the above, according to embodiments of the present disclosure, there may be provided a method and apparatus for failing back block objects in batch. Embodiments of the present disclosure may control an amount of block objects failed back in one batch, and dynamically adjust a delay time between two batches, thereby avoiding any issues with respect to a booting up storage processor in a short term, and meanwhile failback of all block objects on a same file system may be completed in one batch, thereby ensuring substantial consistency. In other embodiments, it may be foreseen that even if an amount of blocks may be further increased for a storage product, a system may ensure that it is in a normal operating state.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of the embodiments of the present disclosure are illustrated or described with block diagrams, flow diagrams or other graphical representations, it would be appreciated that the blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within a context of the present disclosure, the machine readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. Mode detailed examples of a machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

Computer program code for implementing the methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. The program code may be executed completely on the computer, partially on the computer, as an independent software packet, partially on the computer while partially on a remote computer, or completely on the remote computer or server.

Additionally, although the operations are described in a specific order, it should not be understood that such operations may be performed in the order shown or in a successive order, or all of these operations may be performed to obtain a desired result. In some cases, multi-task or parallel processing would be beneficial. Likewise, although some specific implementation details are included in the above discussion, it should not be construed as limiting the scope of any claims, but should be construed as a depiction that may be directed to a specific embodiment herein. Some features described in the contexts of separate embodiments may also be consolidated and implemented in a single embodiment. Alternatively, various features depicted in the context of a single embodiment may also be scattered and implemented in a plurality of embodiments or in any appropriate subcombinations.

Various modifications and changes to the exemplary embodiments of the present disclosure will become apparent to those skilled in the art when viewing the above description along with the accompanying drawings. Any and all modifications may still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that the embodiments of the present disclosure are not limited to specific embodiments disclosed herein, and modifications and other embodiments should all be included within the scope of the appended claims. Although specific terms are used here, they are only used in general and descriptive senses, not for a purpose of limitation.

What is claimed is:

1. A method for performing batch failback to a block object, the method comprising:
   performing a first plurality of failback operations in a first batch to a part of block objects of a first file system if the first plurality is less than or equal to a threshold;
   suspending the first plurality of failback operations in the first batch if the first plurality is greater than the threshold;
   determining a delay time required for performing a second plurality of failback operations in a second batch to a part of block objects of a second file system based on the recorded number of block objects that have been failed back in the first batch;
   performing the second plurality of failback operations in the second batch after the delay time if a sum of the first and the second pluralities is less than or equal to the threshold; and
   suspending the second plurality of failback operations in the second batch if the sum is greater than the threshold.

2. The method according to claim 1, wherein when a storage processor is booting up, a list of two or more existing file systems is built such that failback operations are performed in a batch on one or more of the existing file systems.

3. The method according to claim 2, wherein performing failback operations comprises:
   traversing the list of existing file systems to locate a current file system, the current file system comprising block objects to be failed back; and
   performing failback operations in a batch for a part of block objects on the current file system.

4. The method according to claim 3, wherein performing failback operations for the block objects further comprises:
   suspending the failback operations in the batch based on an amount of file systems being found.

5. The method according to claim 4, wherein suspending the failback operations further comprises:
   comparing an amount of file systems being found with a second threshold; and
   suspending the failback operations in the batch when the amount of file systems found is greater than the second threshold.

6. The method according to claim 1, wherein performing failback operations further comprises:
   in a batch, performing failback operations to all block objects on a same file system.

7. The method according to claim 1, wherein performing failback operations further comprises:
   recording an amount of block objects that have already issued failback operations in the batch; and
   suspending the failback operations in the batch based on the amount of block objects.

8. The method according to claim 1, wherein determining the delay time comprises:
   recording a first amount of block objects that have already issued failback operations in a latest batch; and
   computing a second amount of block objects that have already issued failback operations in latest multiple batches.

9. The method according to claim 8, wherein determining the delay time further comprises:
   computing the delay time required for performing the failback operations in a subsequent batch based on the amount of block objects recorded in the first and second file systems.

10. An apparatus for performing batch failback of block objects, the apparatus comprising:
    one or more processors; and
    computer-executable logic operating in memory across the one or more processors, wherein the computer-executable program logic is configured to execute the method of claim 1.

11. The apparatus according to claim 10, wherein when a storage processor is booting up, a list of two or more existing file systems is built such that failback operations are performed in a batch on one or more of the existing file systems.

12. The apparatus according to claim 11, wherein the computer-executable program logic is further configured to enable execution of:
    traversing the list of existing file systems to locate a current file system, the current file system comprising block objects to be failed back; and
    performing failback operations in a batch for a part of block objects on the current file system.

13. The apparatus according to claim 12, wherein the computer-executable program logic is further configured to enable execution of:
    suspending the failback operations in the batch based on an amount of file systems being found.

14. The apparatus according to claim 13, wherein the computer-executable program logic is further configured to enable execution of:
    comparing an amount of file systems being found with a second threshold; and
    suspending the failback operations in the batch when the amount of file systems found is greater than the second threshold.

15. The apparatus according to claim 10, wherein the computer-executable program logic is further configured to enable execution of:
    in a batch, performing failback operations to all block objects on a same file system.

16. The apparatus according to claim 10, wherein the computer-executable program logic is further configured to enable execution of:
    recording an amount of block objects that have already issued failback operations in the batch; and
    suspending the failback operations in the batch based on the amount of block objects.

17. The apparatus according to claim 10, wherein the computer-executable program logic is further configured to enable execution of:
    recording a first amount of block objects that have already issued failback operations in a latest one batch; and
    computing a second amount of block objects that have already issued failback operations in latest multiple batches.

18. A computer program product comprising a non-transitory computer readable medium encoded with computer executable code, wherein the code enables execution across one or more processors for performing the method of claim 1.

* * * * *